March 4, 1941.  D. G. HOLLENBECK  2,233,611

FRUIT AND VEGETABLE WASHER

Filed May 24, 1939  2 Sheets-Sheet 1

INVENTOR
D. G. Hollenbeck

BY
ATTORNEY

March 4, 1941.    D. G. HOLLENBECK    2,233,611
FRUIT AND VEGETABLE WASHER
Filed May 24, 1939    2 Sheets-Sheet 2
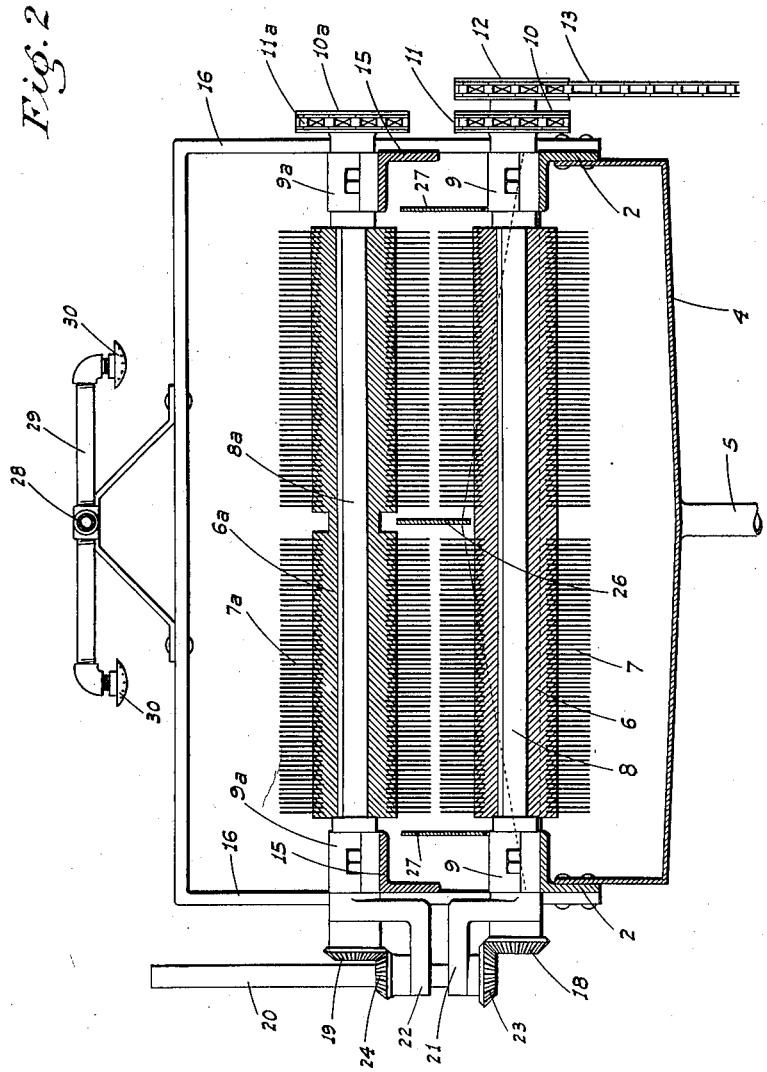
INVENTOR
D. G. Hollenbeck
BY
ATTORNEY Patented Mar. 4, 1941

2,233,611

UNITED STATES PATENT OFFICE 2,233,611

FRUIT AND VEGETABLE WASHER

Dale G. Hollenbeck, Stockton, Calif., assignor to Thornton Canning Co., Thornton, Calif., a corporation of California Application May 24, 1939, Serial No. 275,392

1 Claim. (Cl. 146—202)

This invention relates in general to an improvement in equipment for preparing fruit and vegetables for canning, and in particular the invention is directed to an improved washer for fruits or vegetables.

The principal object of the present invention is to provide a multiple rotary brush washer arranged to thoroughly wash fruits and vegetables without bruising or damaging the same; the device being especially designed for use in connection with the washing of fresh asparagus.

Another object of the invention is to provide a fruit and vegetable washer of the type described which includes an upper and a lower bank of rotary brushes mounted in cooperating and adjustable relation; the brushes of one of the banks preferably being driven at a slower speed than the brushes of the other bank whereby to increase the brushing and cleaning action on objects passing or being conveyed between the banks of brushes.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 1 is a side elevation of the washer and with the guard plate removed from the near side.

Figure 2 is a cross sectional elevation on line 2—2 of Fig. 1.

Referring now more particularly to the characters of reference on the drawings, the device comprises a lower frame or bed 1 preferably disposed on a slight downward slope toward the discharge end of the washer, said frame including a pair of longitudinally extending parallel side beams 2 disposed in transversely spaced relation; there being supporting legs 3 for each end of said frame. A water catch pan 4 may be disposed between and supported by beams 2, such pan being as long as the frame and having a drain pipe 5 adjacent the lower end.

A multiplicity of drum type rotary brushes, including cores 6, bristles 7, and supporting shafts 8, extend transversely of frame 1 between beams 2 thereof and comprise the lower bank; the shafts 8 projecting from the ends of the cores and being rotatably carried in bearing blocks 9 mounted atop beams 2. While the bristles are relatively short they are nevertheless relatively small in cross section and sufficiently limber to prevent injury to fruit or vegetables engaged thereby. At one end and beyond the bearing blocks 9, the shafts are fitted with pulleys or sprockets 10, and all the brushes of the lower bank are driven from an endless chain or belt 11 which is carried by said sprockets. The end shaft at the lower end of the frame is provided with another sprocket 12 driven from motor (not shown) by a drive chain 13.

An upper frame 14 including transversely spaced side beams 15 is disposed above the lower frame 1 and is of substantially the same size and configuration, such upper frame being supported in vertically adjustable relation to the lower frame 1 by means of vertically slotted uprights 16 and cooperating bolt and clamping plate units 17. The uprights 16 are rigidly mounted on and upstand from the side beams 2 of frame 1.

The upper frame supports other drum type rotary brushes in transverse position; said other brushes constituting the upper bank and being of the same construction as those of the lower bank and including cores 6a, bristles 7a, and supporting shafts 8a journaled at their ends in bearing blocks 9a on side beams 15. Shafts 8a carry sprockets or pulleys 10a on one end and these sprockets are all driven by an endless chain or belt 11a. The brushes of the upper bank are mounted with their axes staggered relative to the axes of the brushes of the lower bank.

The shafts at the lowermost end of the device, and at their ends opposite sprockets 10 and 10a, are extended beyond their journals and each is fitted with a bevel gear indicated at 18 and 19 respectively. An upstanding shaft 20 extends through the outer ends of right angle guide brackets 21 and 22 whose inner ends are turnably mounted on and extend radially from the shafts and toward each other. A third bevel gear 23, below bracket 21, is fixed on the lower end of shaft 20 and meshes with bevel gear 18. A fourth bevel gear 24 is splined or slidably keyed on shaft 20, above bracket 22, and meshes with bevel gear 19, and a set screw 25 normally holds gear 24 and shaft 20 in fixed relation lengthwise of the shaft. When the upper frame and upper bank of brushes are being adjusted for clearance and depending on the fruit or vegetable to be washed, the set screw is released and gear 24 moved up or down the shaft as the case may be. The gears 18 and 23 are of such relative size that the brushes of the upper bank are driven at a slower speed than the brushes of the lower bank.

A vertical separator plate 26 extends the full length of the device centrally of its sides and between the upper and lower banks of brushes whereby fruit or vegetables of two different grades or sizes may be washed simultaneously without intermingling the same; this separator plate dividing the device into two separate washing channels. Side or guard plates 27 extend lengthwise in the plane of the adjacent portions of the brushes in the upper and lower banks and prevent escape of fruit or vegetables beyond the ends of the brushes.

A water supply pipe 28 extends longitudinally and centrally of the device above the upper bank of brushes, and lateral feed pipes 29 fitted with spray heads 30 maintain both the upper and lower banks of brushes under a continuous spray of water.

Operation

In operation, the fruit or vegetables to be washed are fed into the upper end of the machine from a suitable conveyor 31, and thence pass between the brushes of the upper and lower banks and which as stated, are disposed so that the axis of the brushes of one bank are staggered relative to the axis of the other bank. The periphery of each brush therefore approaches the periphery of two brushes of the other bank. The space S between brushes is adjustable as is obvious and depends on the kind and size of fruit or vegetable to be washed.

As the fruit or vegetables pass through the device and between the banks of brushes they are thoroughly brushed by the bristles and the dirt loosened, the water flushing the dirt away. By reason of the fact that the brushes of one bank rotate slower than the brushes of the other bank, the dirt removing action is increased due to the relative rotative movement between said brushes and whose working surfaces revolve in the direction of the lower end of the device. The washed fruit or vegetables are discharged from the lower end of the device onto a suitable carry-away conveyor 32. If desired, the lower frame may be adjustably mounted whereby to increase the slope of the banks of brushes and vary the feed speed through the device as far as the same may be effected by gravity.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a produce washer including cooperating upper and lower banks of rotary brushes having axial shafts, means mounting said banks for relative vertical movement to alter the spacing therebetween, means connecting all the brushes of each bank in driving relation, drive means applied to one brush of one bank, the brushes of the upper and lower banks being parallel and in staggered relation, and drive means between extended shafts of corresponding brushes of said upper and lower banks arranged for operation irrespective of the spacing between said banks; said drive means comprising a bevel gear fixed on each of said extended shafts, other bevel gears meshing with said fixed bevel gears, a common shaft on which said other bevel gears are mounted, said shaft extending to a point a substantial distance beyond one of said other bevel gears, said one gear being slidable but non-rotatable on said common shaft and the other one of said other gears being fixed on said common shaft, and right angle guide brackets each having one leg thereof turnably mounted on one of said extended shafts and said common shaft extending through both of the other legs of said guide brackets, said other legs of the guide brackets maintaining said other bevel gears in mesh with the corresponding ones of said fixed gears.

DALE G. HOLLENBECK.